Jan. 2, 1951　　　　　L. DORFMAN　　　　　2,536,918
IGNITION KEY WARNING DEVICE FOR AUTOMOBILES, ETC
Filed April 26, 1948
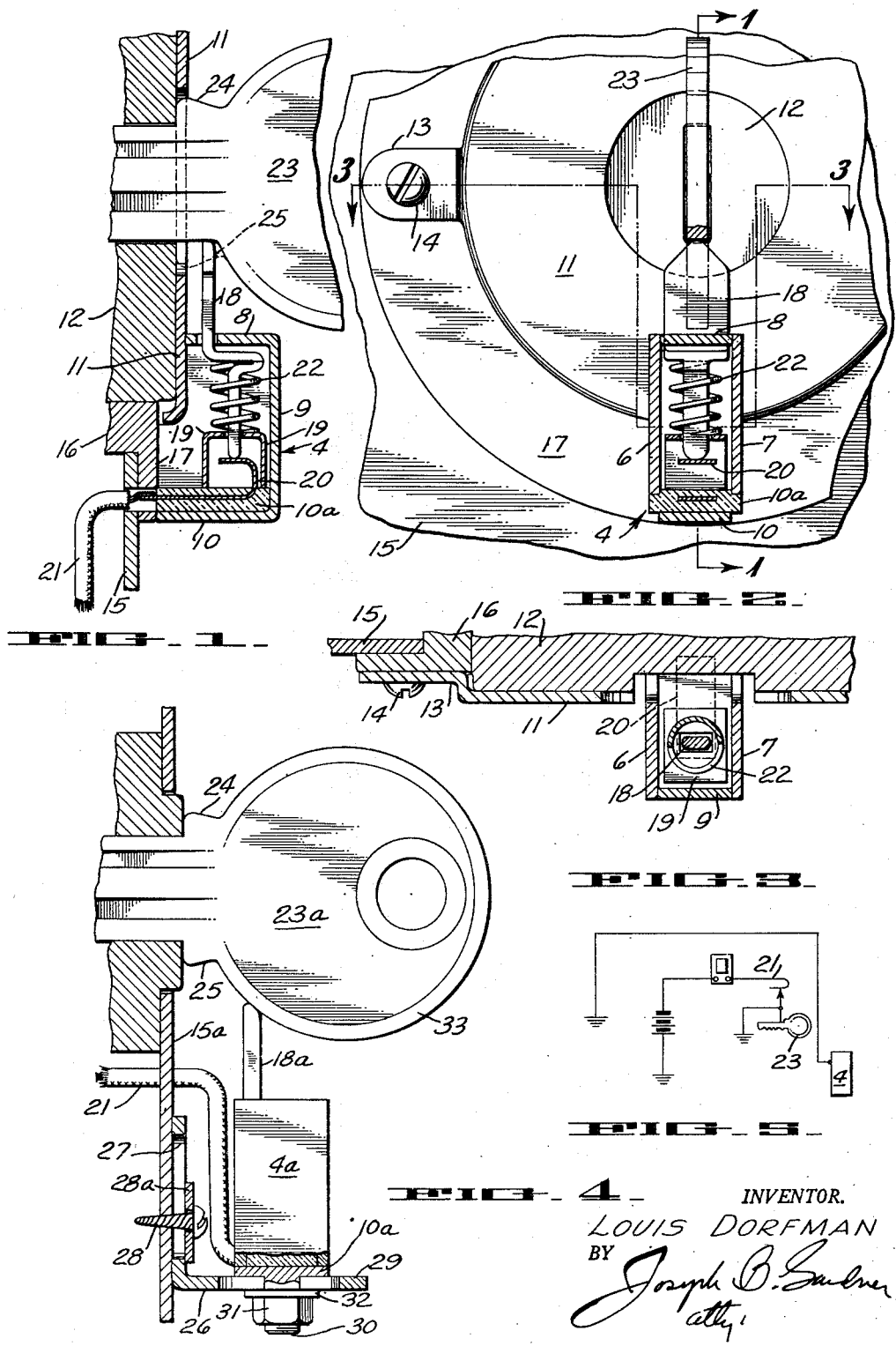
INVENTOR.
LOUIS DORFMAN
BY Joseph B. Gardner
atty.

Patented Jan. 2, 1951

2,536,918

UNITED STATES PATENT OFFICE 2,536,918

IGNITION KEY WARNING DEVICE FOR AUTOMOBILES, ETC.

Louis Dorfman, Oakland, Calif.

Application April 26, 1948, Serial No. 23,334

3 Claims. (Cl. 200—44)

1

This invention relates to signal apparatus intended for use particularly with key-operated devices such as locks. More particularly, the present invention is concerned with key-actuable signal apparatus having great utility in preventing the inadvertent failure to remove the key from lock equipped machinery, motor vehicles, etc. when it is desired to leave the same in a safe or inoperable condition.

It is therefore an object of the invention to provide a novel key-controlled signal apparatus for equipment of the class described which will result in sounding of an alarm in the event that the key is not removed from the lock.

Another object of the invention is to provide an inexpensive and easily constructed switch for an alarm system for automobiles.

A further object of the invention is to provide an alarm switch and mounting therefor which may be readily installed on the instrument panels of present day automobiles.

A still further object of the invention is to provide a key-controlled signal apparatus for automobiles which is operable by only the suitably modified owner's ignition key.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a vertical sectional view of one form of the improved switch of my invention as mounted on an automobile instrument panel and taken on the line 1—1 of Figure 2.

Figure 2 is a front view partly in section of the switch and mounting shown in Figure 1.

Figure 3 is a horizontal sectional view of Figure 2 taken on the line 3—3 thereof.

Figure 4 is a vertical elevational view partly in section of my improved structure and showing a universal instrument panel mounting therefor.

Figure 5 is a schematic circuit diagram showing the electrical wiring of my signal apparatus to a conventional automobile electrical system.

In the embodiment of the invention here illustrated, the device is designed for use with an ignition control wherein the key is arranged to be rotated from an inoperative vertical transverse position to an operative position disposed at less than one-half turn of the key from the inoperative position.

2

In carrying out my invention I provide in Figures 1 to 3 a switch housing 4 which may have the form of a hollow, boxlike member with side walls 6, 7 and an integral lower wall 10, front wall 9 and top wall 8. With the exception of the latter such walls at their rear margins may be suitably united as by soldering to a dished mounting ring 11 adapted to overlie the barrel 12 of the ignition lock of the automobile. Ring 11 may be secured in place on the instrument panel by means such as a number of integral, apertured ears 13 through which screws 14 extend into the automobile instrument panel 15. The usual tumbler casing 16 in which the barrel 12 is journaled includes a peripheral lip, shown in Figure 1 as a depending tab portion 17 which is apertured for the passage of an electrical connector leading to the switch contact as will be later described.

Within the switch housing 4 are disposed for limited vertical movement the necessary switch components and which preferably comprise an elongated and terminally-tapered key-contacting blade 18 having a lower, reversely-bent portion which extends through the slotted upper wall of an inverted cup 19 into contact with a U-shaped resilient contactor 20 the major portion of which is embedded in a rectangular, insulating block which together with the lower wall 10 constitutes a reinforcing closure for the housing 4 at its lower end. As shown in Figure 1 the outer end of contactor 20 is electrically connected to a conductor 21 which leads to the buzzer or other alarm as desired. To normally bias the blade 18 upwardly and out of contact with the contactor 20 when the ignition key is withdrawn from the ignition switch, resilient means such as a coil spring 22 is provided. Spring 22 surrounds the blade porton that is disposed within the housing 4 and exerts an upward pressure against the stepped portion of blade 18 and a downward pressure against the top wall of the cup 19 as will be readily apparent from Figure 1. It will be noted also from a consideration of Figure 2 that the spring-encircled portion of blade 18 is narrowed laterally to provide a corresponding narrow slit in the upper wall of the cup 19 to provide increased structural rigidity in the latter.

The coaction of the ignition key 23 with the switch structure just described will now be detailed. The oppositely disposed shoulders 24 and 25 with which key 23 is provided and which serve as stops for limiting the inward movement of the latter into the lock are modified by the removal of one of the shoulders as by grinding or filing for example; in the ignition lock depicted in Figure 1 the lower shoulder 25 indicated by the dotted line is so removed. Upon inserting the key 23 into the lock, the upper end of the blade 18 is depressed to close the electrical circuit by engagement with contactor 20 and thus energize the alarm as will readily be apparent from Figure 5. When the key is turned out of its vertical inserted position to the "on" position, however, the upper end of blade 18 will glance off the remainder of the shoulder 25 in the direction of the flatwise side of the rotated key under the influence of spring 22 and the switch contact will be opened to inactivate the alarm.

Furthermore, it will be apparent that the presence of the upper end of blade 18 in the path of the key entering the lock will prevent the use of any key that does not have the appropriate shouldered portion 25 removed, despite the accuracy of its contour in other respects. This feature is of value particularly when the car is parked within audible supervision of an attendant as on a parking lot.

While the particular mounting of my alarm switch previously described results in a compact and inconspicuous installation, the location of the ignition switch on certain other makes of cars requires the use of a switch mounting that is not concentric with the ignition lock but may be adjusted to a greater or less distance therefrom to conform to the contour of the instrument panel or to provide greater ease of installation, etc. Such a universal switch mounting is shown in Figure 4 wherein an angle bracket 26 having a slotted vertical portion 27 for the reception of a screw 28 and washer 28a which extends into the instrument panel 15a provides adjustability for the switch 4a. The housing of the latter is generally similar to that shown in Figure 1 except for the addition of an integral depending screw 30 in the lower wall 10a thereof which extends through a longitudinal slot provided in the horizontally extending portion of angle bracket 26. The switch housing 4a is retained in adjusted position within the slot by means of a washer 32 spanning the slot and a nut 31 for tightening the same as will be apparent from Figure 4.

The mounting arrangement just described provides a wide range of adjustability for the switch housing with reference to the instrument panel 15a, enables the tab portion 33 of the key 23a to be used as the switch-closing element and eliminates the necessity of cutting away either of the shouldered portions 24, 25. Since the upper end of the blade 18a in the universal form of the invention just described engages an arc of pronounced curvature, it will be found desirable to widen the key contacting end of the blade from that shown in Figure 1 to equal at least half the width of the blade projecting above the housing 4a. In operation the universal mounting is identical to the first form of the invention. When the key is inserted in the lock as shown in Figure 4 the buzzer (Figure 5) is primarily energized and later deenergized when the key is turned to "on" position. Similarly when the driver turns off the ignition by rotation of the key without withdrawing it from the lock, the buzzer will again be energized to serve as a reminder of this fact, the buzzer continuing to sound until the key is withdrawn from the lock.

From the foregoing it will be seen that I have provided a simple and easily attached apparatus for cautioning a vehicle operator to remove the ignition key from the lock when he intends to leave the vehicle for a time. The simplicity of attachment is such in fact that in most cases the car owner himself can install the switch and buzzer without the use of special equipment. Thus there has been provided an accessory for automobiles which in widespread use should materially reduce the cost of theft insurance for automobiles. Its aid to law observance is readily apparent also, since in most cities of the country today, it is illegal to leave an unlocked vehicle on the streets due to the temptation it presents to unscrupulous juveniles as well as others.

I claim:

1. In alarm apparatus for a motor vehicle provided with an instrument panel mounted ignition switch lock, an electrical switch for energizing said alarm apparatus comprising a housing adapted to be mounted on the exterior of said instrument panel, a relatively rigid switch element and a flexible switch element disposed in cooperating relationship within said housing, a key intercepting extension on said first element adapted to be depressed by a key moving transversely across said extension when said key is inserted in said lock to establish electrical connection of said elements, and resilient means also within said housing and surrounding said rigid switch element for biasing said elements into spaced, electrically disconnected relationship when said key is withdrawn from said ignition switch lock.

2. In alarm apparatus for a motor vehicle provided with an instrument panel mounted ignition switch lock, an electrical switch for energizing said alarm apparatus comprising a slotted bracket adapted to be mounted on said instrument panel, a housing adjustably mounted on said bracket, a relatively rigid switch element and a flexible switch element disposed in cooperating relationship within said housing, a key intercepting extension on said first element adapted to be depressed by a key inserted in said lock to establish electrical connection of said elements, and resilient means also within said housing and surrounding said rigid switch element for biasing said elements into spaced, electrically disconnected relationship.

3. In alarm apparatus for a motor vehicle provided with an instrument panel mounted ignition switch lock, an electrical switch for energizing said alarm apparatus comprising an angle bracket having slotted connection with said panel and an angularly disposed slotted portion extending outwardly therefrom, a housing adjustably mounted on said portion, a pair of cooperating switch elements disposed within said housing and one of which also extends beyond said housing and in the path of a key in its inserted but unlocked position in said ignition switch lock and resilient means also within said housing and serving to maintain said switch elements in spaced relationship when said key is withdrawn from said ignition switch lock.

LOUIS DORFMAN.

REFERENCES CITED

The following references are of record in the file of this patent:

UNITED STATES PATENTS

| Number | Name | Date |
|---|---|---|
| 1,288,074 | Lutz | Dec. 17, 1918 |
| 1,416,485 | Lurie | May 16, 1922 |
| 1,826,105 | Veale | Oct. 6, 1931 |